US008518855B2

(12) United States Patent
Ohno et al.

(10) Patent No.: US 8,518,855 B2
(45) Date of Patent: Aug. 27, 2013

(54) HONEYCOMB STRUCTURE

(75) Inventors: Kazushige Ohno, Ibi-gun (JP); Kazunori Yamayose, Ibi-gun (JP)

(73) Assignee: Ibiden Co., Ltd., Ogaki-shi (JP)

(*) Notice: Subject to any disclaimer, the term of this patent is extended or adjusted under 35 U.S.C. 154(b) by 367 days.

(21) Appl. No.: 12/756,194

(22) Filed: Apr. 8, 2010

(65) Prior Publication Data
US 2010/0222213 A1 Sep. 2, 2010

Related U.S. Application Data

(63) Continuation of application No. PCT/JP2008/056408, filed on Mar. 31, 2008.

(51) Int. Cl.
*B01J 23/00* (2006.01)
(52) U.S. Cl.
USPC .......... 502/351; 502/527.19; 55/522; 55/523; 55/524; 55/527; 264/629; 264/630; 423/598
(58) Field of Classification Search
USPC ..................... 60/299, 311; 55/484, 522–527; 502/527.19, 350, 351; 264/629, 630; 423/598
See application file for complete search history.

(56) References Cited

U.S. PATENT DOCUMENTS

| 7,341,614 | B2 * | 3/2008 | Hayashi et al. ........ 55/523 |
| 2006/0021309 | A1 | 2/2006 | Merkel |
| 2006/0254231 | A1 * | 11/2006 | Hayashi et al. ........ 55/523 |
| 2007/0033912 | A1 | 2/2007 | Furukawa et al. |
| 2007/0039297 | A1 | 2/2007 | Kawata et al. |
| 2008/0092499 | A1 | 4/2008 | Otsuka et al. |

FOREIGN PATENT DOCUMENTS

| EP | 1588995 | 10/2005 |
| JP | 2003-135918 | 5/2003 |
| JP | 2003-193820 | 7/2003 |
| JP | 2003210922 | 7/2003 |
| JP | 2005-519834 | 7/2005 |
| JP | 2006-095352 | 4/2006 |
| JP | 2007-296512 | 11/2007 |
| WO | WO 2005/009922 | 2/2005 |
| WO | WO 2005/021463 | 3/2005 |
| WO | WO 2005/068397 | 7/2005 |
| WO | WO 2006/030811 | 3/2006 |
| WO | WO 2007/064454 | 6/2007 |

OTHER PUBLICATIONS

International Search Report for corresponding International Application No. PCT/JP2008/056408, Dec. 22, 2008.

* cited by examiner

*Primary Examiner* — Kaj K Olsen
*Assistant Examiner* — Pritesh Darji
(74) *Attorney, Agent, or Firm* — Ditthavong Mori & Steiner, P.C.

(57) ABSTRACT

A honeycomb structure includes aluminum titanate, cell walls, and pore portions. The cell walls extend along a longitudinal direction of the honeycomb structure to define cells between the cell walls. The pore portions have an average pore diameter of about 10 µm to about 20 µm. A length of a longest pore portion among the pore portions in a binary image including substrate portions and the pore portions is about 8 times or less of the average pore diameter. The binary image is converted from a microscopic image of a cross section of the cell walls in parallel with the longitudinal direction. The length is measured along a line drawn in a direction perpendicular to a thickness direction of the cell walls.

32 Claims, 11 Drawing Sheets

D-D line cross-sectional view

C-C line cross-sectional view

HONEYCOMB STRUCTURE

CROSS-REFERENCE TO RELATED APPLICATIONS

This application is a continuation application of PCT/JP2008/056408 filed on Mar. 31, 2008. The contents of this application are incorporated herein by reference in their entirety.

BACKGROUND OF THE INVENTION

1. Field of the Invention

The present invention relates to a honeycomb structure.

2. Discussion of the Background

Exhaust gas discharged from internal combustion engines, such as diesel engines, contains particulate matter (hereinafter, also referred to as "PM"). The PM has harmful effects on the environment and the human bodies, and thus the PM has been a recent issue.

In order to capture PM in exhaust gas to purify the exhaust gas, various honeycomb filters have been proposed as exhaust gas filters. These honeycomb filters include a honeycomb structure made of cordierite, silicon carbide, aluminum titanate, or the like.

A honeycomb structure including aluminum titanate has a melting temperature higher than that of a honeycomb structure including cordierite. It is therefore known that the honeycomb structure including aluminum titanate is less likely to be damaged by melting upon burning PM in the case where the honeycomb structure is used as a honeycomb filter. In addition, the honeycomb structure including aluminum titanate has a coefficient of thermal expansion lower than that of a honeycomb structure including silicon carbide. It is therefore known that the honeycomb structure including aluminum titanate is less likely to be damaged by heat applied upon burning PM even in the case where the honeycomb structure is used as a large-size filter.

US 2006/0021309 A1 discloses a honeycomb filter which includes a honeycomb structure mainly including aluminum titanate and showing small variation in the pore diameter distribution. The honeycomb structure is manufactured as follows: a material mixture mainly composed of $Al_2O_2$ and $TiO_2$ is prepared; an oxide of a substance such as Bi, Ca, or Y is added to the material mixture; and the resulting mixture is fired.

FIG. 1A is a perspective view that schematically shows a conventional honeycomb structure mainly including aluminum titanate. FIG. 1B is a cross-sectional view (the D-D line cross-sectional view of FIG. 1A) that schematically shows a cross section of the honeycomb structure exposed by cutting the conventional honeycomb structure shown in FIG. 1A in parallel with the longitudinal direction.

FIG. 1B shows that a conventional honeycomb structure 410 mainly including aluminum titanate has cells 411 which are formed in the longitudinal direction with cell walls 413 interposed therebetween, and that the cell walls 413 separating the cells 411 functions as a filter.

More specifically, in the honeycomb structure 410, each of the cells 411 is sealed with a plug 412 at either one end of an inlet side (flow-in side) or an outlet side (flow-out side) of exhaust gas so that a check pattern is formed as a whole. Exhaust gas flowing into one cell is always caused to pass through the cell wall 413 which separates the one cell from other cells, and then is discharged from the other cells. When the exhaust gas passes through the cell wall 413, PM is captured in the cell wall 413, and thus the exhaust gas is purified.

The contents of US2006/0021309A are incorporated herein by reference in their entirety.

SUMMARY OF THE INVENTION

According to one aspect of the present invention, a honeycomb structure includes aluminum titanate, cell walls, and pore portions. The cell walls extend along a longitudinal direction of the honeycomb structure to define cells between the cell walls. The pore portions have an average pore diameter of about 10 μm to about 20 μm. A length of a longest pore portion among the pore portions in a binary image including substrate portions and the pore portions is about 8 times or less of the average pore diameter. The binary image is converted from a microscopic image of a cross section of the cell walls in parallel with the longitudinal direction. The length is measured along a line drawn in a direction perpendicular to a thickness direction of the cell walls.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4C is an enlarged view of one portion in FIG. 4B (the portion sandwiched between the broken lines in FIG. 4B) including the line (the A-A line in FIG. 4B) drawn in the direction perpendicular to the thickness direction of the cell wall;

DESCRIPTION OF THE EMBODIMENTS

The exhaust-gas filter including the conventional honeycomb structure which mainly includes aluminum titanate and is disclosed in US 2006/0021309 A1 does not have a sufficiently high PM capture efficiency and a sufficiently high breaking strength. Thus, there have been demands for further improvement of the PM capture efficiency and breaking strength.

In order to solve these problems, the present inventors have studied the honeycomb structure mainly including aluminum titanate.

Figure 1A:
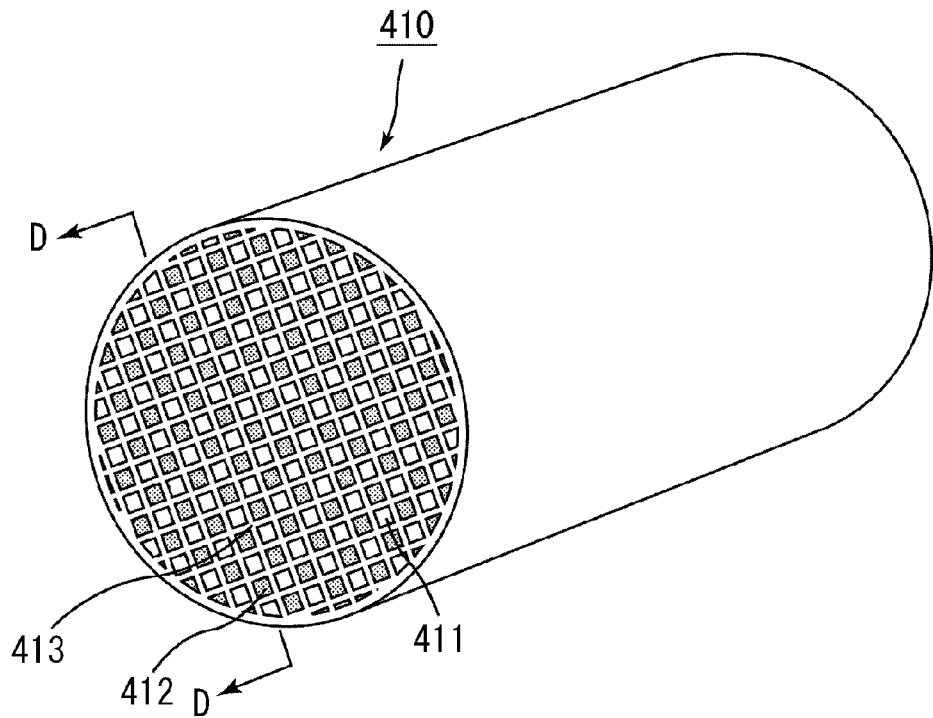
FIG. 1A is a perspective view that schematically shows a conventional honeycomb structure mainly including aluminum titanate.
Figure 1B:
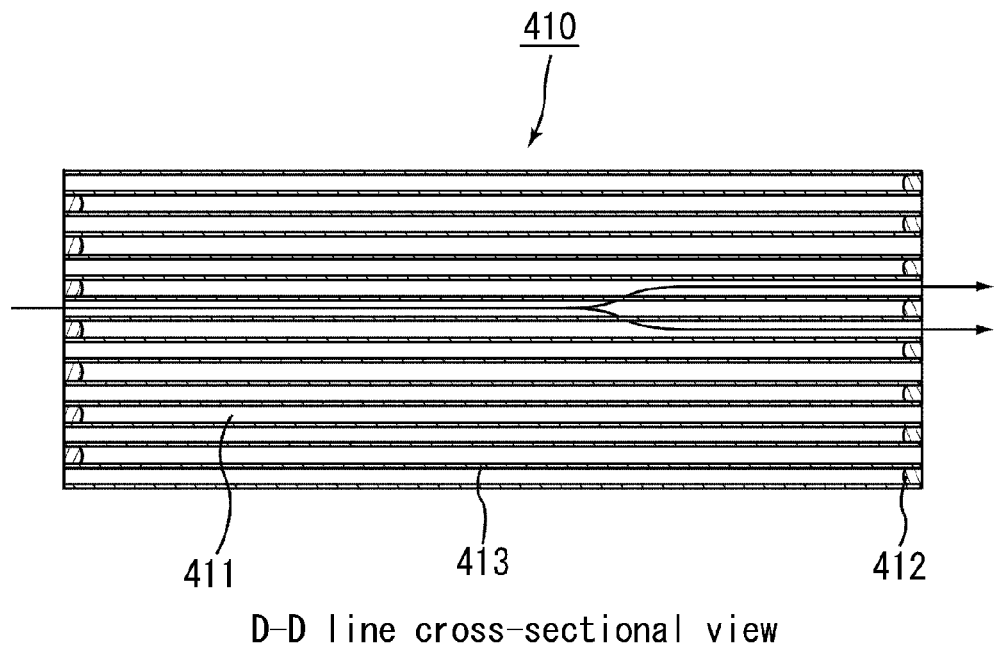
FIG. 1B is a cross-sectional view (the D-D line cross-sectional view of FIG. 1A) that schematically shows a cross section of the honeycomb structure exposed by cutting the conventional honeycomb structure shown in FIG. 1A in parallel with the longitudinal direction.
Figure 2:
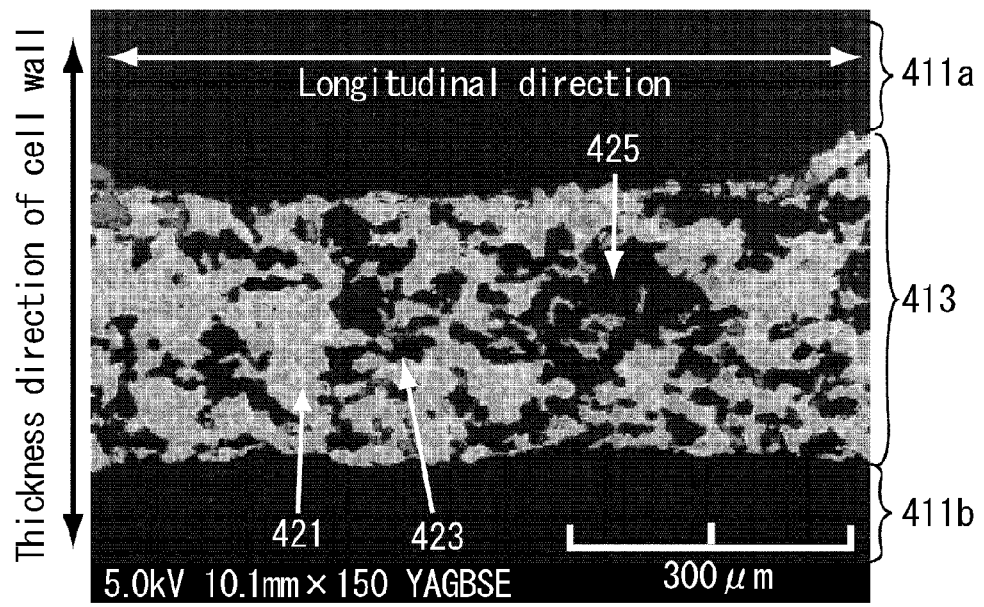
FIG. 2 is a partially enlarged image that shows a part of a cross section of the cell wall in the conventional honeycomb structure shown in FIG. 1B photographed by a scanning electron microscope (SEM) (at a magnification of 150×)

FIG. 2 is a partially enlarged image of a part of a cross section of the cell wall of the conventional honeycomb structure shown in FIG. 1B. This image is photographed by a scanning electron microscope (SEM) (at a magnification of 150×).

The present inventors have detailedly observed the inside of the cell wall 413 of the conventional honeycomb structure 410 mainly including aluminum titanate. Thus, the present inventors have found substrates 421 made of aluminum titanate and pores 423 as shown in FIG. 2. The inventors have further found a comparatively large pore portion 425 having a pore length of 10 μm or longer (hereinafter, such a portion is also referred to as a "large pore portion") in the cross section of the cell wall 413.

This conventional honeycomb structure has been considered to have a pore diameter distribution with small variation measured by mercury porosimetry; however, the observation results show that the inside of the cell wall contains a large pore portion.

This is presumably because the pore diameter distribution was measured by mercury porosimetry in US 2006/0021309 A1; such measurement of the pore diameter distribution by the mercury porosimetry only determines the pore diameter distribution on the surface of the cell wall. Thus, the pore diameter distribution may be measured to show small variation even though the honeycomb structure has a large pore portion inside the cell wall.

The following will describe the large pore portion in the conventional honeycomb structure referring to the drawing.

Figure 3:
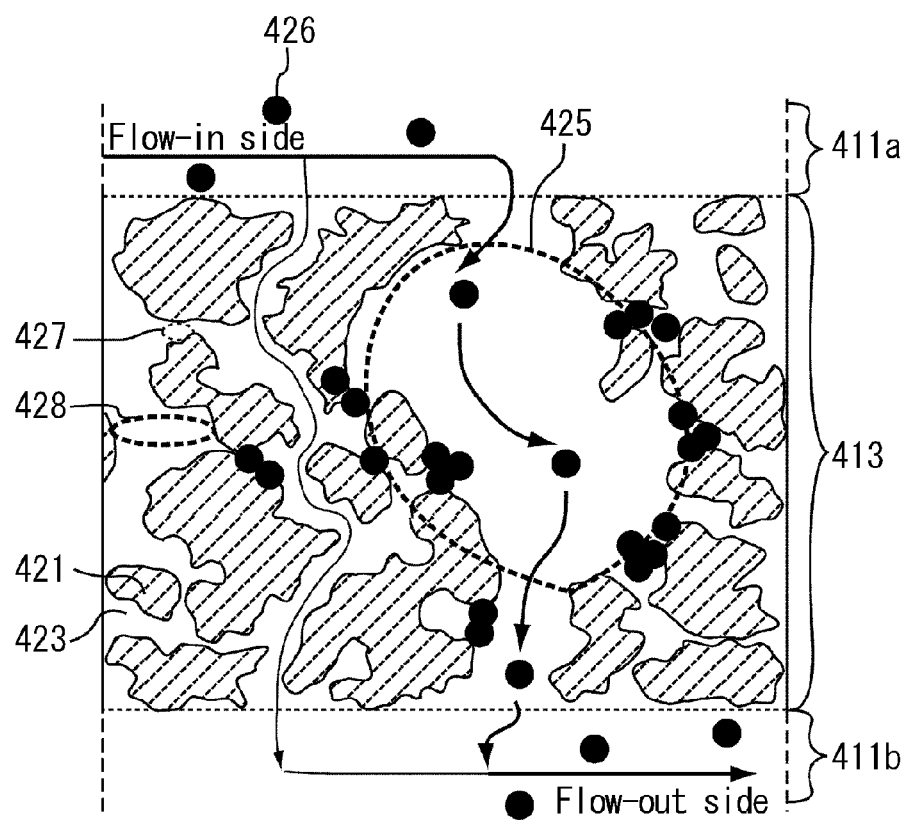
FIG. 3 is a cross-sectional view that schematically shows the vicinity of a large pore portion in the partially enlarged image of FIG. 2.

FIG. 3 is a cross-sectional view that schematically shows the vicinity of a large pore portion in the partially enlarged image of the cell wall of the conventional honeycomb structure shown in FIG. 2. In FIG. 3, a direction of each arrow schematically indicates a flowing direction of exhaust gas, and a width of each arrow schematically indicates a flowing amount of the exhaust gas.

In general, the honeycomb structure having a pore diameter distribution with large variation at the cell wall presumably has a lower PM capture efficiency.

As shown in FIG. 3, a large pore portion 425 in the conventional honeycomb structure allows the exhaust gas to easily flow therethrough. This presumably may result in fewer opportunities for PM 426 to be in contact with the cell wall. Thus, presumably, the PM 426 is less likely to be captured by the substrate 421 and may easily pass therethrough.

As a result, part of the PM 426 in the exhaust gas is less likely to be captured by the substrate 421 while the exhaust gas tends to flow into a cell 411a which has an opening at the inlet side and tends to flow out through a cell 411b which has an opening at the outlet side. Such a phenomenon is considered to likely cause a low PM capture efficiency of the conventional honeycomb structure 410.

The large pore portion 425 inside the cell wall 413 tends to cause a locally poor strength of the cell wall 413 in the vicinity of the large pore portion 425; such a portion presumably serves as a starting point of a crack. This is considered to likely cause a low breaking strength of the conventional honeycomb structure 410.

The honeycomb structure according to an embodiment of the present invention for solving the aforementioned problem is a honeycomb structure including aluminum titanate, wherein a plurality of cells are formed in the longitudinal direction with cell walls interposed therebetween; an average pore diameter is from about 10 μm to about 20 μm; and in a binary image consisting of substrate portions and pore portions, the length of the longest pore portion is about 8 times or less of the average pore diameter, wherein the binary image is converted from a microscopic image of a cross section of the cell wall in parallel with the longitudinal direction, and the length is measured along a line drawn in the direction perpendicular to the thickness direction of the cell wall.

Because the honeycomb structure according to the embodiment of the present invention has an average pore diameter of from about 10 μm to about 20 μm, the honeycomb structure including aluminum titanate is likely to have a high PM capture efficiency while maintaining a low pressure loss.

In addition, the honeycomb structure according to the embodiment of the present invention easily captures PM because the length of the longest pore portion (maximum length) is about 8 times or less of the average pore diameter. This is because exhaust gas tends to uniformly flow through the whole cell wall, and thus the cell wall of the whole honeycomb structure tends to be more effectively used so as to capture PM in the exhaust gas.

Thus, the honeycomb structure including aluminum titanate is likely to have a high PM capture efficiency. This will be described hereinbelow in detail with reference to the drawings.

Figure 4A:
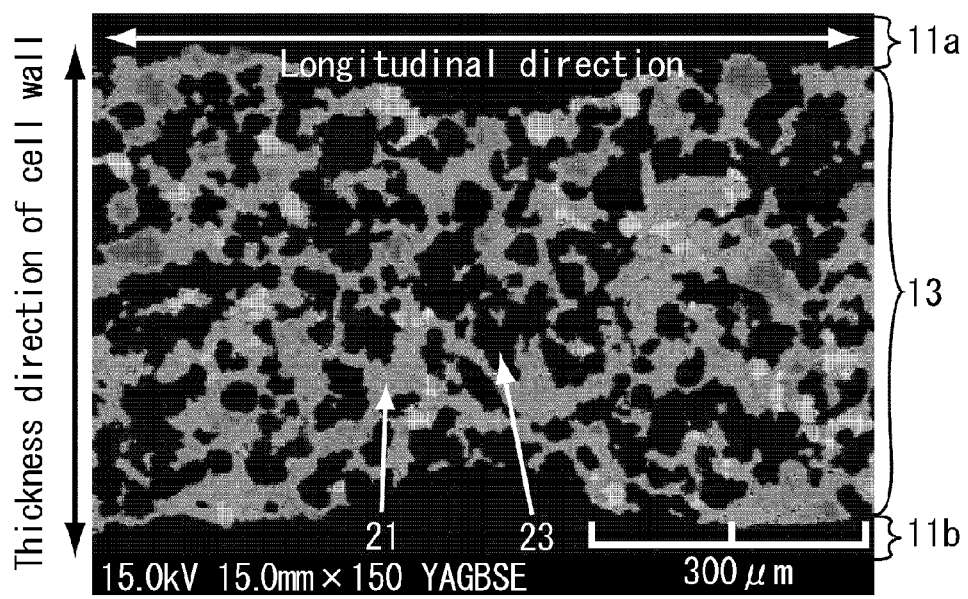
FIG. 4A is a partially enlarged image that shows a part of a cross section of the honeycomb structure exposed by cutting the honeycomb structure in parallel with the longitudinal direction and is photographed by a scanning electron microscope (SEM) (at a magnification of 150×) according to one example of the honeycomb structure according to an embodiment of the present invention.
Figure 4B:
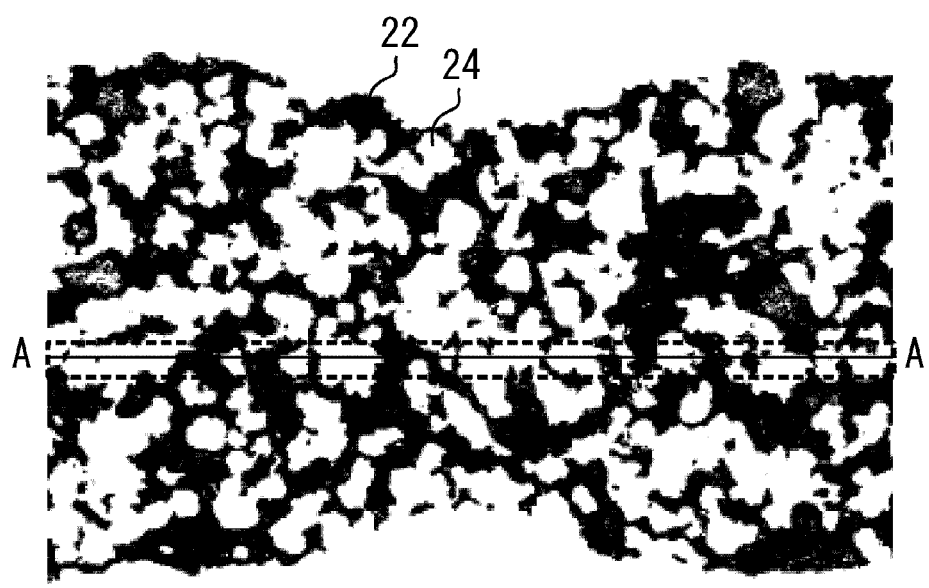
FIG. 4B is a binary image of the partially enlarged image of FIG. 4A, consisting of substrate portions indicating the substrates as blackened portions and of pore portions indicating the pores as whitened portions.

FIG. 4A is a partially enlarged image of apart of a cross section of the honeycomb structure exposed by cutting the honeycomb structure in parallel with the longitudinal direction according to one example of a honeycomb structure according to the embodiment of the present invention. This image is photographed by a scanning electron microscope (SEM) (at a magnification of 150×). FIG. 4B is a binary image of the partially enlarged image of FIG. 4A. In FIG. 4B, the substrates are blackened as substrate portions, while the pores are whitened as pore portions. Thus, these two portions are distinguished from each other. FIG. 4C is an enlarged view of the portion in FIG. 4B (the portion sandwiched between the broken lines in FIG. 4B) including the line (the A-A line in FIG. 4B) drawn in the direction perpendicular to the thickness direction of the cell wall.

As shown in FIG. 4A, detail observation of the inside of a cell wall 13 of the honeycomb structure clarifies that the cell wall 13 of the honeycomb structure consists of substrates 21 made of aluminum titanate and pores 23; that is, the honeycomb structure has a porous structure.

This porous structure is analyzed in more detail. First, as shown in FIG. 4B and FIG. 4C, a binary image of the cell wall is prepared as follows: the cell wall 13 of the honeycomb structure is cut in parallel with the longitudinal direction so that a cross section of the cell wall 13 is exposed; a part of the cross section of the cell wall 13 is photographed by an SEM to provide a partially enlarged image; this partially enlarged image is binarized to generate a binary image consisting of substrate portions 22 (blackened portions, corresponding to the substrates 21) and pore portions 24 (whitened portions, corresponding to the pores 23). On the binary image, a line (the A-A line in FIG. 4B) is drawn in the direction perpendicular to the thickness direction of the cell wall 13. The length of the longest pore portion 24 is measured along the line (the A-A line in FIG. 4B). The length (indicated by the double headed arrow in FIG. 4C) of the longest pore portion 24 is about 8 times or less ($\leq$ about 8×$\alpha$) of the average pore diameter ($\alpha$).

Referring to the drawings, the following will describe a mechanism that exhaust gas flows through the cell wall of the honeycomb structure in which the length of the longest pore portion is about 8 times or less of the average pore diameter and thus PM in the exhaust gas is captured.

Figure 5:
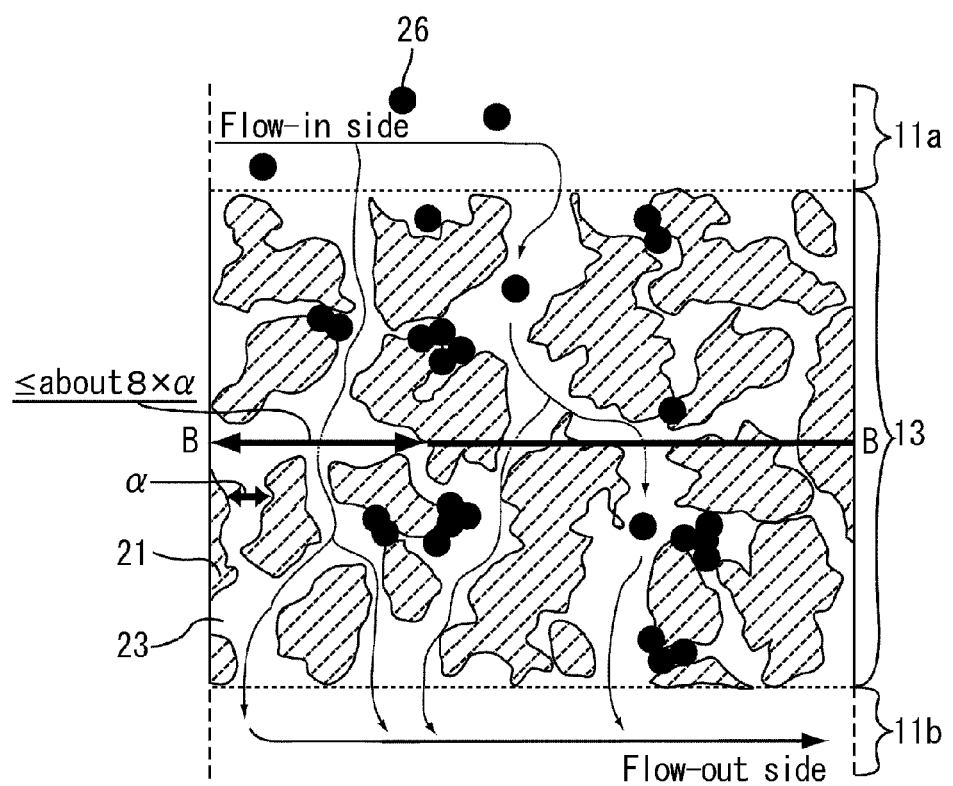
FIG. 5 is a cross-sectional view that schematically shows a part of the partially enlarged image shown in FIG. 4A.

FIG. 5 is a cross-sectional view that schematically shows a part of the partially enlarged image of the cell wall 13 shown in FIG. 4A. In FIG. 5, a direction of each arrow schematically indicates a flowing direction of exhaust gas, and a width of each arrow schematically indicates a flowing amount of the exhaust gas. Further, in FIG. 5, the B-B line is a line drawn in the direction perpendicular to the thickness direction of the cell wall 13. The portion indicated by the double headed arrow on the B-B line corresponds to the longest pore portion on the B-B line in the binary image of the corresponding partially enlarged image. The length thereof is about 8 times or less of the average pore diameter ($\alpha$) (indicated as $\leq$ about 8×$\alpha$ in FIG. 5).

The cell wall 13 shown in FIG. 5 has no longest pore portion with a length exceeding about 8 times of the average pore diameter.

At the time when exhaust gas flows into the cell wall 13 from a cell 11$a$ having an opening at the flow-in side, the exhaust gas is likely to more uniformly flow through the whole cell wall 13. Thus, presumably, the cell wall of the whole honeycomb structure tends to be more efficiently used so as to capture PM 26 in the exhaust gas. Thus, the PM 26 is less likely to be contained in the exhaust gas which flows out through a cell 11$b$ having an opening on the flow-out side.

For the aforementioned reason, the honeycomb structure including aluminum titanate according to the embodiment of the present invention is likely to have a high PM capture efficiency.

In addition, the honeycomb structure according to the embodiment of the present invention has no longest pore portion with a length exceeding about 8 times of the average pore diameter; such a portion is considered to likely cause local reduction in strength of the cell wall and to likely serve as a starting point of a crack. Thus, the honeycomb structure including aluminum titanate is likely to have a high breaking strength.

In the honeycomb structure according to the embodiment of the present invention, the length of the longest pore portion is about 7 times or less of the average pore diameter.

The honeycomb structure according to the embodiment of the present invention has no longest pore portion with a length exceeding about 7 times of the average pore diameter, and thus PM is more likely to be captured. Further, exhaust gas tends to more uniformly flow through the whole cell wall, and thus the cell wall of the whole honeycomb structure tends to be more effectively used so as to capture PM in the exhaust gas.

Thus, the honeycomb structure including aluminum titanate tends to have a higher PM capture efficiency.

In addition, the honeycomb structure according to the embodiment of the present invention has no longest pore portion with a length exceeding about 7 times of the average pore diameter; such a portion is considered to likely cause local reduction in strength of the cell wall and to likely serve as a starting point of a crack. Thus, the honeycomb structure including aluminum titanate is likely to have a higher breaking strength.

In the honeycomb structure according to the embodiment of the present invention, the length of the longest pore portion is about 5 times or less of the average pore diameter.

The honeycomb structure according to the embodiment of the present invention has no longest pore portion with a length exceeding about 5 times of the average pore diameter, and thus PM is extremely likely to be captured. Further, exhaust gas tends to extremely uniformly flow through the whole cell wall, and thus the cell wall of the whole honeycomb structure tends to be extremely effectively used so as to capture PM in the exhaust gas.

Thus, the honeycomb structure including aluminum titanate tends to have an extremely high PM capture efficiency.

In addition, the honeycomb structure according to the embodiment of the present invention has no longest pore portion with a length exceeding about 5 times of the average pore diameter; such a portion is considered to likely cause local reduction in strength of the cell wall and to likely serve as a starting point of a crack. Thus, the honeycomb structure including aluminum titanate is likely to have an extremely high breaking strength.

In the honeycomb structure according to the embodiment of the present invention, a total volume of pores having a pore diameter within a range from (the average pore diameter–about 2 μm) to (the average pore diameter+about 2 μm) in a pore diameter distribution occupies about 60% or more of the whole pore volume.

In the honeycomb structure according to the embodiment of the present invention, the pores occupying about 60% by volume or more of the whole pore volume each have a pore diameter within the range appropriate for capturing PM. Thus, the honeycomb structure tends to have relatively more pores appropriate for capturing PM than others, so that the honeycomb structure including aluminum titanate is likely to have a higher PM capture efficiency.

In the honeycomb structure according to the embodiment of the present invention, a total volume of pores having a pore diameter within a range from (the average pore diameter–about 2 μm) to (the average pore diameter+about 2 μm) in a pore diameter distribution occupies about 70% or more of the whole pore volume.

In the honeycomb structure according to the embodiment of the present invention, the pores occupying about 70% by volume or more of the whole pore volume each have a pore diameter within the range appropriate for capturing PM. Thus, the honeycomb structure tends to have relatively more pores more appropriate for capturing PM than others, so that the honeycomb structure including aluminum titanate is likely to have an extremely high PM capture efficiency.

The honeycomb structure according to the embodiment of the present invention has a porosity of from about 40% to about 50%.

The honeycomb structure having a porosity of from about 40% to about 50% according to the embodiment of the present invention is likely to have a higher breaking strength and is less likely to be damaged.

Thus, the honeycomb structure including aluminum titanate is likely to have a higher breaking strength.

In the honeycomb structure according to the embodiment of the present invention, each of the cells is sealed at either one end.

The honeycomb structure with each of the cells sealed at either one end is likely to be used as a filter for purifying exhaust gas.

Figure 6A:
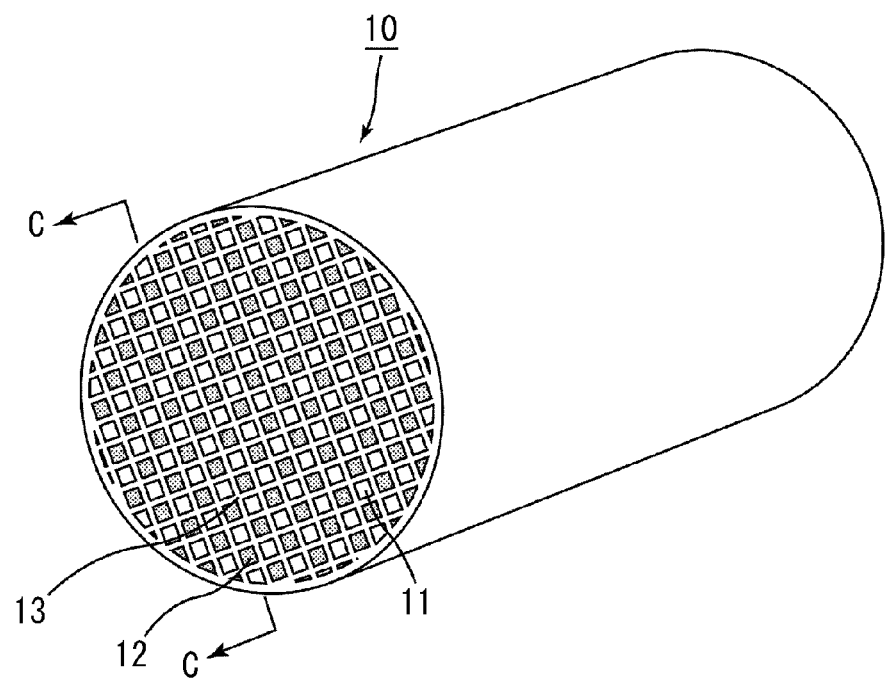
FIG. 6A is a perspective view that schematically shows one example of the honeycomb structure according to an embodiment of the present invention.
Figure 6B:
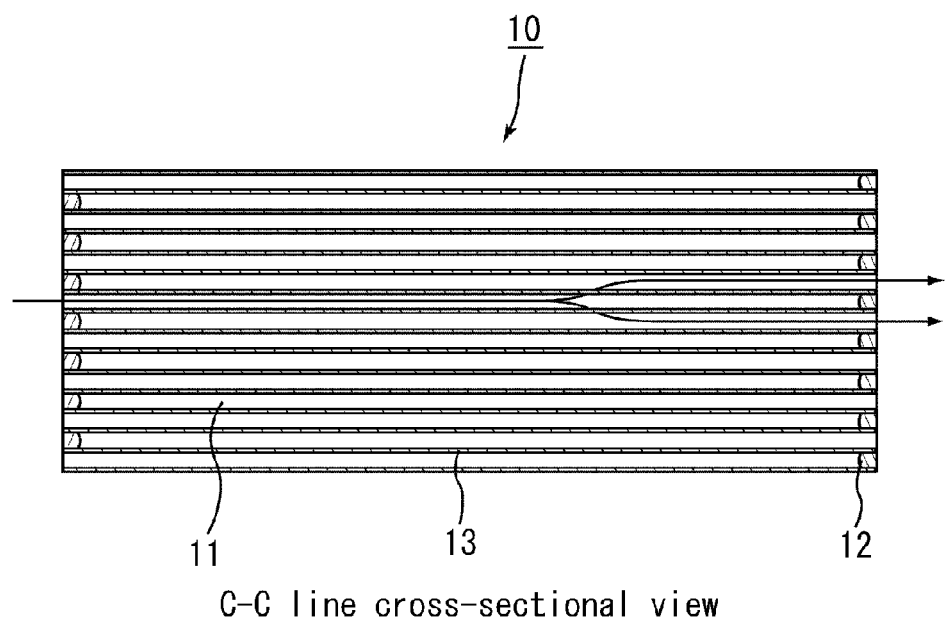
FIG. 6B is a cross-sectional view (the C-C line cross-sectional view of FIG. 6A) that shows a cross section of the honeycomb structure exposed by cutting the honeycomb structure shown in FIG. 6A in parallel with the longitudinal direction.

Referring to FIG. 6A and FIG. 6B, the following will describe a first embodiment as one embodiment of the present invention.

FIG. 6A is a perspective view that schematically shows one example of the honeycomb structure according to an embodiment of the present invention. FIG. 6B is a cross-sectional view (the C-C line cross-sectional view of FIG. 6A) that schematically shows one example of a cross section of the honeycomb structure exposed by cutting the honeycomb structure shown in FIG. 6A in parallel with the longitudinal direction.

As shown in FIG. 6A, a honeycomb structure 10 includes aluminum titanate, and has a substantially round-pillar shape. As shown in FIG. 6B, cells 11 are formed along the longitudinal direction of the honeycomb structure 10 with cell walls 13 interposed between the cells 11.

In addition, each of the cells 11 is sealed with a plug 12 at either one end.

The plug 12 is made of the same material as that of the honeycomb structure 10, namely, aluminum titanate. In the honeycomb structure 10, each of the cells 11 is sealed with the plug 12 at either one end so that exhaust gas is prevented from leaking from one end of each of the cells 11. Thus, exhaust gas (indicated by the arrow in FIG. 6B) flowing into one cell is always caused to pass through a cell wall 13 which separates the one cell from other cells, and then is discharged from the other cells. When the exhaust gas passes through the cell wall 13, PM is captured in the cell wall 13, and thus the exhaust gas is purified.

Detail observation of the inside of the cell wall 13 of the honeycomb structure clarifies that the cell wall 13 of the honeycomb structure consists of the substrates 21 made of aluminum titanate and the pores 23; that is, the honeycomb structure has a porous structure.

The honeycomb structure 10 has an average pore diameter of from about 10 $\mu$m to about 20 $\mu$m. The average pore diameter is an average value of the pore diameters of the pores measured by mercury porosimetry.

In the honeycomb structure of the present embodiment, a total volume of pores having a pore diameter within a range from (the average pore diameter−about 2 $\mu$m) to (the average pore diameter+about 2 $\mu$m) in a pore diameter distribution occupies about 60% or more of the whole pore volume measured by mercury porosimetry.

For example, in the case of the honeycomb structure 10 having an average pore diameter of 15 $\mu$m, about 60% or more of the pores has a pore diameter of from about 13 $\mu$m to about 17 $\mu$m.

In addition, the honeycomb structure 10 according to the embodiment of the present invention has a porosity measured by mercury porosimetry of from about 40% to about 50%.

The following will specifically describe measuring methods for characteristic values such as an average pore diameter, porosity, and pore diameter distribution of the pores formed in the honeycomb structure.

A honeycomb structure is cut so as to provide a 1 cm width cubic sample. The pore diameter and pore distribution (pore diameter distribution) of the obtained sample are measured by a pore distribution measuring apparatus using mercury porosimetry in the range of a pore diameter of 0.2 to 500 $\mu$m. The average pore diameter and porosity of the obtained sample are determined from the measurement of the pore diameter distribution.

With respect to the honeycomb structure 10, a cross section in parallel with the longitudinal direction of the cell wall 13 is photographed by an SEM to provide a partially enlarged image thereof. The partially enlarged image is converted into a binary image consisting of substrate portions which indicate the substrates and of pore portions which indicate the pores. A line is drawn on the binary image in the direction perpendicular to the thickness direction of the cell wall 13, and the length of the longest pore portion is measured along the line. The length of the longest pore portion is about 8 times or less of the average pore diameter. For example, in the case of the honeycomb structure 10 having an average pore diameter of 15 $\mu$m, the length of the longest pore portion of the honeycomb structure is about 120 $\mu$m or less.

The following will detailedly describe a method for binarizing the image of the honeycomb structure and a method for measuring the length of the longest pore portion in the binary image of the honeycomb structure.

First, a cross section in parallel with the longitudinal direction of the cell wall of the honeycomb structure is photographed by an SEM at a magnification of 150× to provide a partially enlarged image of the cross section of the cell wall. In the partially enlarged image, brighter portions indicate portions (pixels) where the substrates densely exist, and darker portions indicate portions (pixels) corresponding to pore portions where the substrates hardly exist. Thus, the resulting image has contrast in luminance.

Next, in the partially enlarged image thus obtained, each of the pixels having a certain degree of luminance is classified at a predetermined threshold value so that the brighter pixels are blackened and the darker pixels are whitened. That is, the substrates are blackened as substrate portions and the pores are whitened as pore portions. Thus, the partially enlarged image is binarized to provide a binary image of the cross section of the cell wall.

On the binary image which is generated from the partially enlarged image of the cross section of the cell wall and which consists of the substrate portions and the pore portions, a line is drawn in the direction perpendicular to the thickness direction of the cell wall of the honeycomb structure so that the line passes through at least two substrate portions and at least two pore portions. The length of the longest pore portion (whitened portion) is measured along the line by a scale.

Then, a ratio of the length of the longest pore portion to the average pore diameter of the honeycomb structure is calculated.

The following will describe a method for manufacturing the honeycomb structure 10 of the present embodiment.

Powders of $Al_2O_3$ and $TiO_2$ and additives such as MgO and alkaline feldspar are mixed to prepare a material powder. The obtained material powder is heated, dried, and sintered to manufacture a sintered body of aluminum titanate.

The manufactured sintered body of aluminum titanate is pulverized and classified to prepare a coarse powder of aluminum titanate.

A separately manufactured sintered body of aluminum titanate is also pulverized and classified at a different degree of pulverization and classification to prepare a fine powder of aluminum titanate.

The coarse powder of aluminum titanate, the fine powder of aluminum titanate, a pore-forming agent, an organic binder, a plasticizer, a lubricant, and water are mixed and sufficiently stirred to prepare a mixture.

The average pore diameter and the lengths of the pore portions of the honeycomb structure to be manufactured are adjusted depending on the particle diameter or a particle-distribution index of the pore-forming agent to be added upon preparing the mixture.

The particle distribution of the pore-forming agent is determined as follows: the particle diameter distribution of the pore-forming agent is measured by a laser diffraction scattering method to determine a 90% particle diameter "D90", a 50% particle diameter "D50", and a 10% particle diameter "D10"; and then, the particle-distribution index is calculated by the following equation:

Particle-distribution index=$(D90-D10)/D50$

Next, the mixture is extrusion-molded by an extrusion-molding apparatus to manufacture a long body of a round pillar-shaped honeycomb molded body having cells formed in the longitudinal direction with cell walls interposed therebetween.

Next, the long body of the honeycomb molded body is cut into a predetermined length by a cutting apparatus provided with a cutting disc as a cutter. The honeycomb molded body thus obtained is then dried at from about 100° C. to about 150° C. for from about 1 minute to about 30 minutes under air atmosphere by a micro-wave drying apparatus and a hot-air drying apparatus.

Next, each of the cells of the honeycomb molded body is filled with a plug material paste at either one end so that predetermined cells of the honeycomb molded body are filled with the plug material paste made of the same material as that of the mixture.

Further, the honeycomb molded body with each of the cells filled with the plug material paste at either one end is dried again. Then, the honeycomb molded body is degreased at from about 250° C. to about 400° C. for from about 3 hours to about 15 hours under an oxygen concentration of about 5% by volume to air atmosphere in a degreasing furnace, and then is fired at from about 1300° C. to about 1600° C. for from about 3 hours to about 24 hours in a firing furnace.

The honeycomb structure of the present embodiment is manufactured through the aforementioned processes.

The effects of the honeycomb structure of the first embodiment are listed below.

(1) The honeycomb structure has an average pore diameter of from about 10 μm to about 20 μm. Thus, the honeycomb structure including aluminum titanate is likely to have a high PM capture efficiency while maintaining a low pressure loss.

(2) In a binary image which consists of substrate portions and pore portions, which is converted from a microscopic image of a cross section of the cell wall in parallel with the longitudinal direction, and on which a line is drawn in the direction perpendicular to the thickness direction of the cell wall, the length of the longest pore portion measured along the line is about 8 times or less of the average pore diameter. Thus, PM is likely to be captured. In addition, exhaust gas is likely to uniformly flow through the whole cell wall. Thus, the cell wall of the whole honeycomb structure tends to be effectively used to capture PM in the exhaust gas.

Consequently, the honeycomb structure including aluminum titanate is likely to have a high PM capture efficiency.

(3) The honeycomb structure has no longest pore portion with a length exceeding about 8 times of the average pore diameter; such a pore portion is considered to likely cause local reduction in strength of the cell wall and to likely serve as a starting point of a crack. Thus, the honeycomb structure including aluminum titanate is likely to have a high breaking strength.

(4) In the honeycomb structure, pores occupying about 60% by volume or more of the whole pore volume have a pore diameter within (the average pore diameter±about 2 μm) in a pore diameter distribution. These pores are likely to have a pore diameter within a range appropriate for capturing PM. As the honeycomb structure of the present embodiment has a pore diameter distribution within the aforementioned range, the honeycomb structure tends to have relatively more pores appropriate for capturing PM than others. Thus, the honeycomb structural body including aluminum titanate is likely to have a high PM capture efficiency.

(5) The honeycomb structure has a porosity of from about 40% to about 50%, so that the honeycomb structure tends to have a sufficient breaking strength and is less likely to be damaged.

Thus, the honeycomb structure including aluminum titanate is likely to have a high breaking strength.

(6) In the honeycomb structure of the present embodiment, each of the cells is sealed at either one end. Thus, the honeycomb structure is likely to be used as a filter for purifying exhaust gas.

The following will describe examples which more specifically disclose the first embodiment of the present invention. The present invention is not limited to these examples.

EXAMPLES

Example 1

(1) Mixing Step 2,000 parts by weight of a coarse powder of aluminum titanate (average particle diameter: 25 μm), 500 parts by weight of a fine powder of aluminum titanate (average particle diameter: 0.5 μm), 300 parts by weight of a pore-forming agent (spherical acrylic particles), 188 parts by weight of an organic binder (methylcellulose), 96 parts by weight of a plasticizer (UNILUB, produced by NOF Corp.), 44 parts by weight of a lubricant (glycerin), and 725 parts by weight of water were mixed and sufficiently stirred to prepare a mixture.

The pore-forming agent used herein had an average particle diameter of 20 μm and a particle-distribution index of 1.8.

(2) Extrusion-Molding Step

The mixture obtained in step (1) was charged into a cylinder from a mixture tank of a plunger-type extrusion molding apparatus. A piston was pushed in toward a die of a cylindrical shape so that the mixture was extruded through the die. Thereby, a long body of the round pillar-shaped honeycomb molded body including aluminum titanate was manufactured. In the long body of the round pillar-shaped honeycomb molded body, cells were formed along the longitudinal direction with cell walls interposed therebetween.

(3) Cutting Step

The long body of the honeycomb molded body obtained in step (2) was cut by a cutting apparatus provided with a cutting disc as a cutter. Thereby, a round pillar-shaped honeycomb molded body including aluminum titanate was obtained.

(4) Drying Step

The honeycomb molded body obtained in step (3) was dried at 120° C. for 20 minutes under air atmosphere by a micro-wave drying apparatus and a hot-air drying apparatus. Thereby, moisture in the honeycomb molded body was removed.

(5) Sealing Step

Plug material pastes made of the same material as that of the mixture prepared in step (1) were filled into predetermined cells of the honeycomb molded body so that each of the cells of the dried honeycomb molded body obtained in step (4) is filled with the plug material paste at either one end.

(6) Degreasing and Firing Step

The honeycomb molded body obtained in step (5) was again dried at 120° C. for 10 minutes under air atmosphere, then degreased at 300° C. for 12 hours under an oxygen concentration of 6% by volume in a degreasing furnace, and further fired at 1500° C. for 15 hours in a firing furnace.

Thereby, a honeycomb structure including aluminum titanate was manufactured. The honeycomb structure had a diameter of 143.8 mm and a length of 150 mm in the longitudinal direction, and included 46.5 pcs/cm$^2$ of cells which had a wall thickness of 0.25 mm and which were formed along the longitudinal direction.

Measurement of the characteristic values of the honeycomb structure by the aforementioned mercury porosimetry provided an average pore diameter of 15 µm and a porosity of 40%. The measurement further showed that pores occupying 60% by volume or more of the whole pore volume had a pore diameter of 13 to 17 µm in the pore diameter distribution.

According to the aforementioned binarization method of the partially enlarged image and measurement method of the length of the longest pore portion in the binary image of the honeycomb structure, the length of the longest pore portion was measured as follows. The cell wall of the honeycomb structure was cut in parallel with the longitudinal direction; the cross section of the cell wall exposed thereby was photographed by an SEM at any five portions to prepare partially enlarged images; each of the partially enlarged images was converted into a binary image consisting of the substrate portions (blackened portions) indicating the substrates and the pore portions (whitened portions) indicating the pores; a line was drawn in the direction perpendicular to the thickness direction of the cell wall; and the length of the longest pore portion was measured along the line. The length of the longest pore portion was 72 µm, and it corresponded to 4.8 times of the average pore diameter.

Measurement of the capture efficiency and breaking strength were performed on the honeycomb structure manufactured in the present example, and their characteristics were evaluated.

(Evaluation of PM Capture Efficiency)

Figure 7:
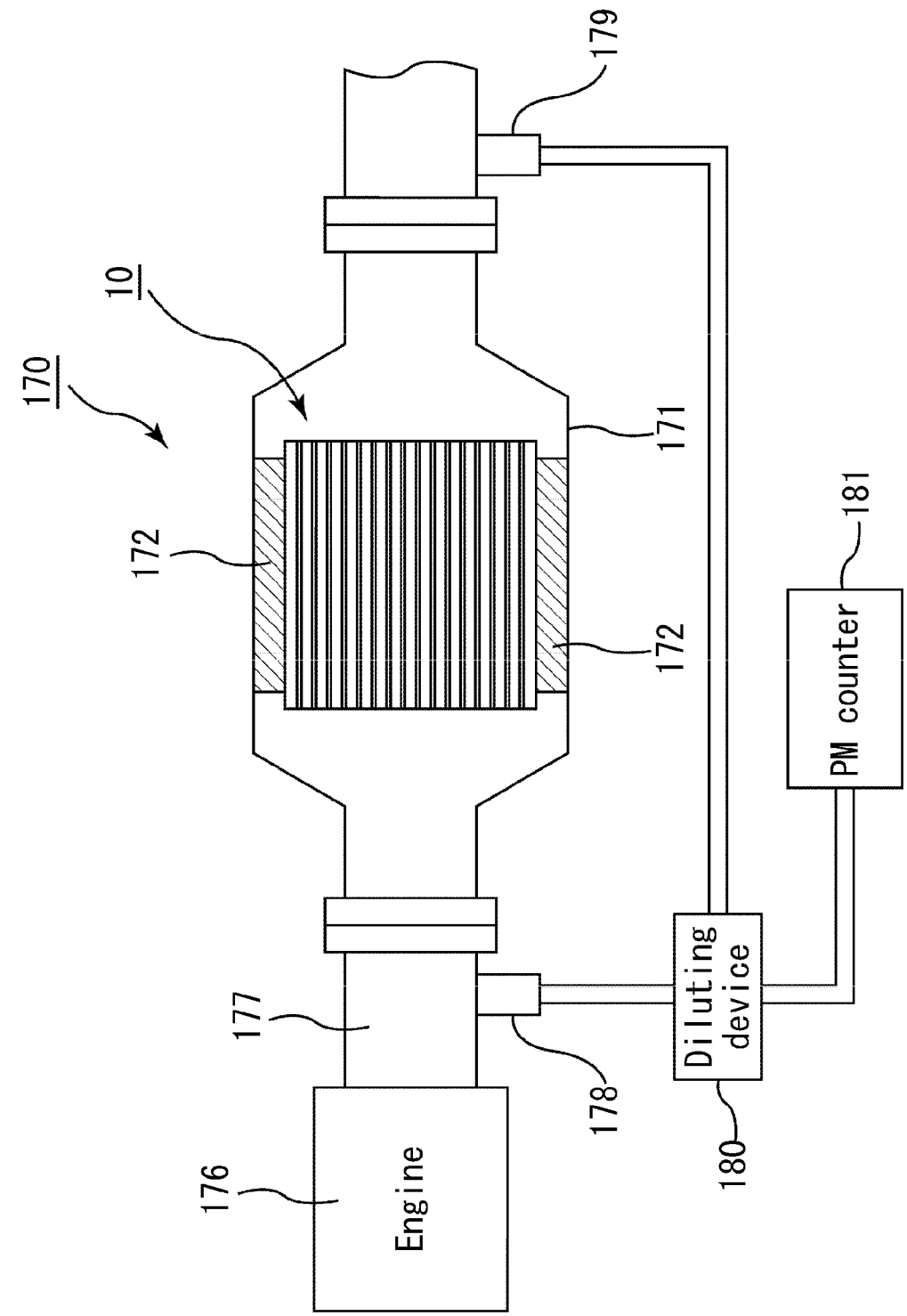
FIG. 7 is an explanatory view of a capture efficiency measuring apparatus.

The PM capture efficiency was measured with a capture efficiency measuring apparatus 170 shown in FIG. 7. FIG. 7 is an explanatory view of the PM capture efficiency measuring apparatus.

This PM capture efficiency measuring apparatus 170 is prepared as a scanning mobility particle sizer (SMPS) provided with a 2-L (liter) common-rail diesel engine 176; an exhaust-gas pipe 177 through which the exhaust gas from the engine 176 passes; a metal casing 171 which is connected to the exhaust-gas pipe 177 and which secures the honeycomb structure 10 wrapped with an alumina mat 172; a sampler 178 for sampling the exhaust gas before passing through the honeycomb structure 10; a sampler 179 for sampling the exhaust gas after passing through the honeycomb structure 10; a diluting device 180 for diluting the exhaust gas sampled by the samplers 178 and 179; and a PM counter 181 (a condensation particle counter 3022A-S, produced by TSI, Inc.) for measuring the amount of PM in the diluted exhaust gas.

Next, the following will describe the measurement procedure. The engine 176 was driven at a rotational speed of 3,000 min$^{-1}$ and a torque of 30 Nm, and exhaust gas from the engine 176 was introduced into the honeycomb structure 10. At that time, the amount of PM before passing through the honeycomb structure 10 ($P_0$) and the amount of PM after passing through the honeycomb structure 10 ($P_1$) were determined by the PM counter 181. Then, the PM capture efficiency was calculated by the following equation.

PM capture efficiency (%)=$[(P_0-P_1)/P_0]\times 100$

As a result, the PM capture efficiency of the honeycomb structure manufactured in example 1 was 95%.

(Evaluation of Breaking Strength)

The honeycomb structure was cut to prepare a test piece having a size of 34.3 mm square and a length of 150 mm. The test piece was subjected to a three-point bending test at a span of 130 mm and a velocity of 0.5 mm/min with an Instron 5582 in accordance with JIS R 1601. Thereby, the bending strength of the honeycomb structure was measured.

As a result, the breaking strength of the honeycomb structure manufactured in Example 1 was 6.8 MPa.

Table 1 shows the characteristics and evaluation results of the honeycomb structure manufactured in Example 1.

The contents of JIS R 1601 are incorporated herein by reference in their entirety.

Examples 2 to 5, Comparative Examples 1 and 2

Except that the particle diameter of the coarse powder of the aluminum titanate, the particle diameter and particle-distribution index of the spherical acrylic particles as the pore-forming agent, both of which were contained in the material of the honeycomb structure, and the firing time in the firing step were changed as shown in Table 1, the honeycomb structure was manufactured in the same manner as in Example 1.

The honeycomb structure thus manufactured was subjected to the measurement of the average pore diameter, porosity, pore diameter distribution, length of the longest pore portion, PM capture efficiency, and breaking strength in the same manner as in Example 1.

Also in the pore diameter distribution of each of the honeycomb structures manufactured in Examples 2 to 5, a total volume of pores having a pore diameter of (average pore diameter±about 2 µm) occupied about 60% or more of the whole pore volume.

Table 1 shows the characteristics and evaluation results of the honeycomb structures manufactured in Examples 2 to 5 and Comparative Examples 1 and 2.

The term "ratio" in Table 1 refers to a ratio of the length of the longest pore portion to the average pore diameter.

TABLE 1

| | Manufacturing conditions | | | | Pore shapes | | | Evaluation results | |
|---|---|---|---|---|---|---|---|---|---|
| | Particle diameter of coarse powder (μm) | Particle diameter of pore-forming agent (μm) | Particle distribution index of pore-forming agent | Firing time (hr) | Average pore diameter (μm) | Length of the longest pore portion (μm) | Ratio | PM capture efficiency (%) | Breaking strength (MPa) |
| Example 1 | 25 | 20 | 1.8 | 15 | 15 | 72 | 4.8 | 95 | 6.8 |
| Example 2 | 25 | 30 | 2.0 | 5 | 15 | 102 | 6.8 | 92 | 6.6 |
| Example 3 | 25 | 40 | 2.0 | 3 | 15 | 118 | 7.9 | 89 | 6.5 |
| Example 4 | 15 | 30 | 1.8 | 5 | 11 | 84 | 7.6 | 96 | 6.8 |
| Example 5 | 40 | 40 | 1.8 | 5 | 20 | 130 | 6.5 | 87 | 6.3 |
| Comparative Example 1 | 25 | 40 | 2.2 | 1 | 15 | 125 | 8.3 | 75 | 5.7 |
| Comparative Example 2 | 15 | 40 | 2.0 | 1 | 11 | 90 | 8.2 | 79 | 5.9 |

Figure 8:
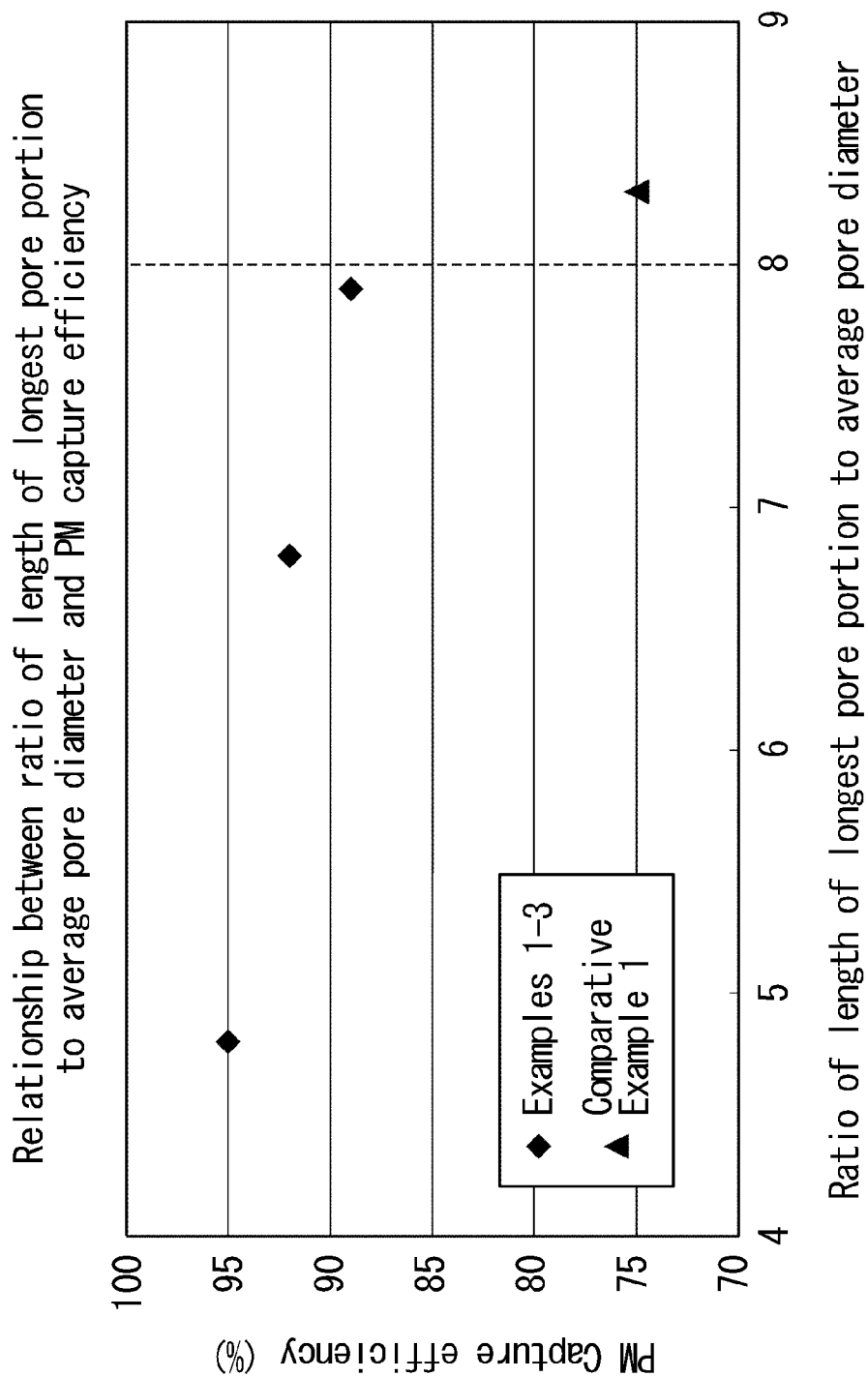
FIG. 8 is a graph that shows the relationship between a ratio of the length of the longest pore portion to the average pore diameter and a PM capture efficiency according to Examples 1 to 3 and Comparative Example 1; the ratio is indicated along the horizontal axis and the capture efficiency is indicated along the vertical axis.
Figure 9:
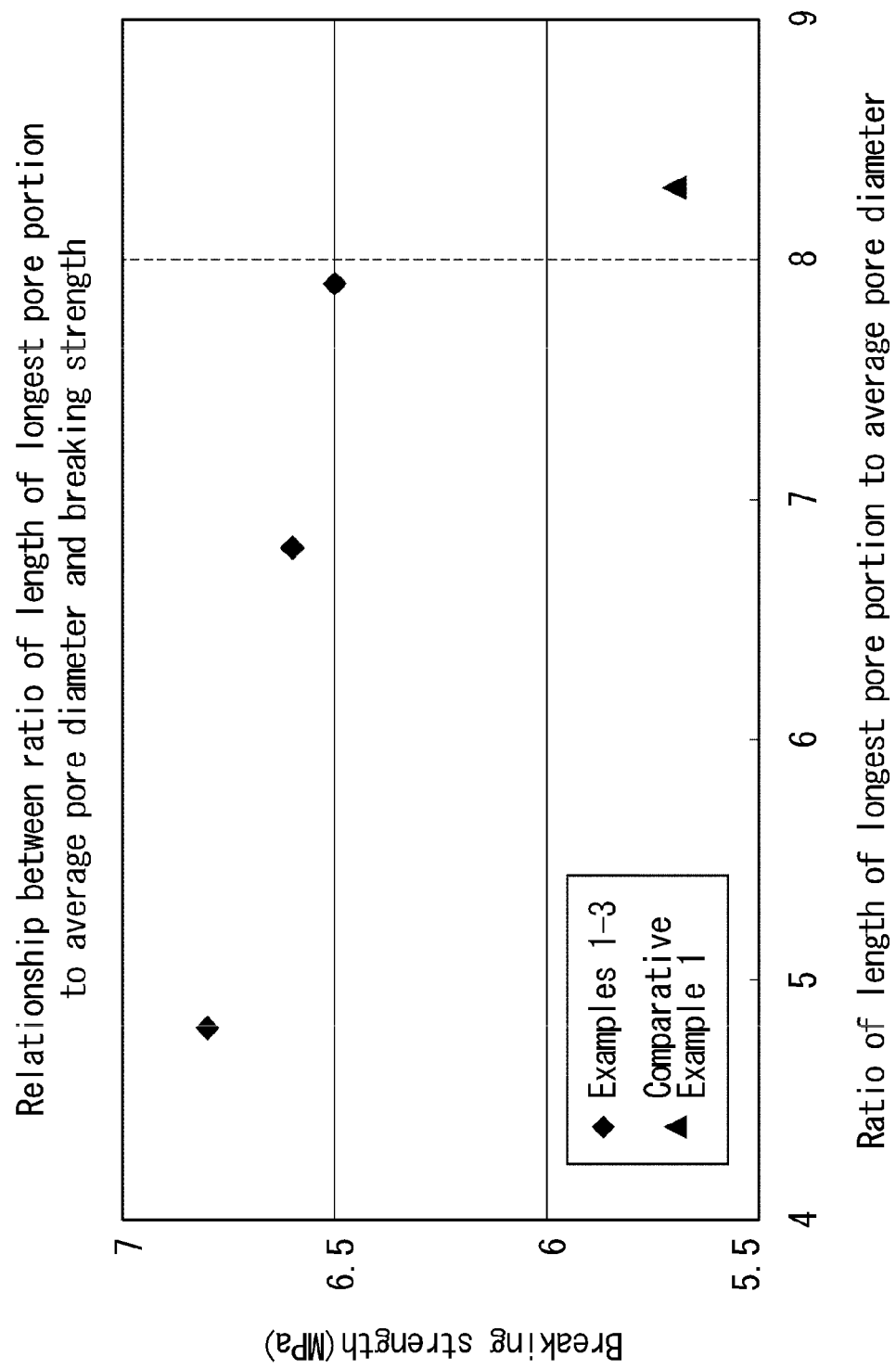
FIG. 9 is a graph that shows the relationship between a ratio of the length of the longest pore portion to the average pore diameter and a breaking strength according to Examples 1 to 3 and Comparative Example 1; the ratio is indicated along the horizontal axis and the breaking strength is indicated along the vertical axis.

FIG. 8 is a graph that shows the relationship between a ratio of the length of the longest pore portion to the average pore diameter and a PM capture efficiency according to Examples 1 to 3 and Comparative Example 1; the ratio is indicated along the horizontal axis and the capture efficiency is indicated along the vertical axis. FIG. 9 is a graph that shows the relationship between a ratio of the length of the longest pore portion to the average pore diameter and a breaking strength according to Examples 1 to 3 and Comparative Example 1; the ratio is indicated along the horizontal axis and the breaking strength is indicated along the vertical axis.

These results show that the honeycomb structures of Examples 1 to 5 each tended to have a high PM capture efficiency and a high breaking strength.

On the other hand, the honeycomb structures of Comparative Examples 1 and 2 each had a low PM capture efficiency and a low breaking strength.

(Other Embodiments)

The threshold value for binarization of the partially enlarged image taken by an SEM is not particularly limited. The threshold value may be appropriately selected depending on luminance so that the substrate portions and the pore portions are distinguished from each other after binarization. In addition, colors in the binary image are not particularly limited as long as the substrate portions and the pore portions can be distinguished from each other after binarization.

In the binarization of the image and the measurement of the length of the longest pore portion in the binary image, part of or all of the operations, from photographing of a microscopic image to measurement of the length of the longest pore portion in the obtained binary image, may be automatically performed by an apparatus with predetermined data preliminarily input.

The average pore diameter of the honeycomb structure according to the embodiment of the present invention is measured by using a mercury porosimeter.

The porosity may be measured by a known method such as mercury porosimetry, a method based on weight, or the Archimedes' method.

The shape of the cross section perpendicular to the longitudinal direction of the honeycomb structure according to the embodiment of the present invention is not particularly limited to a substantially circular shape, and may be various shapes such as a substantially rectangular shape. The cross-sectional shape is desirably defined only by a curved line or by a curved line and a straight line.

Specific examples other than the substantially circular shape include a substantially elliptical shape, a substantially oval shape, a substantially race-track shape, a shape derived from a partially concave simple closed curve such as a substantially ellipse or a substantially oval (a concave shape), and the like.

The lower limit of the aperture ratio of the honeycomb structure according to the embodiment of the present invention is desirably about 50%, and the upper limit thereof is desirably about 75%.

An aperture ratio of about 50% or more is less likely to cause a high pressure loss when exhaust gas flows into and out from the honeycomb structure. An aperture ratio of about 75% or less is less likely to cause a low strength of the honeycomb fired body.

The cell wall of the honeycomb structure according to the embodiment of the present invention desirably has a thickness of about 0.15 mm or greater. A thickness of about 0.15 mm or more tends not to cause a low strength of the honeycomb fired body.

The desirable upper limit of the thickness of the cell wall is about 0.4 mm. The thickness of the cell wall of about 0.4 mm or less tends not to cause a low aperture ratio and/or filtration area of the cells, which allows the honeycomb structure to have a low pressure loss.

The cell density of the honeycomb structure according to the embodiment of the present invention in the direction perpendicular to the longitudinal direction is not particularly limited. The desirable lower limit thereof is about 23.3 pcs/cm$^2$ (about 150 pcs/in$^2$), and the desirable upper limit thereof is about 93.0 pcs/cm$^2$ (about 600 pcs/in$^2$). The more desirable lower limit thereof is about 31 pcs/cm$^2$ (about 200 pcs/in$^2$), and the more desirable upper limit thereof is about 77.5 pcs/cm$^2$ (about 500 pcs/in$^2$).

The plane shape of the cell is not particularly limited to a substantially quadrangular shape, and may be any shape such as a substantially triangular shape, a substantially hexagonal shape, a substantially octagonal shape, a substantially dodecagonal shape, a substantially circular shape, a substantially elliptical shape, or a substantially star shape.

The coarse powder of aluminum titanate according to the embodiment of the present invention desirably has an average particle diameter of from about 5.0 μm to about 50.0 μm. The fine powder of aluminum titanate according to the embodiment of the present invention desirably has an average particle diameter of from about 0.1 μm to about 3.0 μm.

The mixing ratio of the coarse powder of aluminum titanate to the fine powder of aluminum titanate in the material powder according to the embodiment of the present invention is desirably from about (9:1) to about (6:4). The mixing ratio in the aforementioned range tends to prevent shrinkage in the firing step and tends to enable adjustment of the average pore diameter, pore diameter distribution, and porosity.

The organic binder to be used upon preparing the mixture according to the embodiment of the present invention is not particularly limited. Examples thereof include methyl cellulose, carboxymethyl cellulose, hydroxyethyl cellulose, polyethylene glycol, and the like. In particular, methyl cellulose is desirably used. The desirable amount of the organic binder to be blended is generally from about 1 part by weight to about 10 parts by weight per 100 parts by weight of the aluminum titanate powder.

The plasticizer and the lubricant to be used upon preparing the mixture according to the embodiment of the present invention are not particularly limited. Examples of the plasticizer include glycerin or the like. Examples of the lubricant include polyoxyalkylene compounds such as polyoxyethylene alkyl ethers and polyoxypropylene alkyl ethers, and the like.

Specific examples of the lubricant include polyoxyethylene monobutyl ether, polyoxypropylene monobutyl ether, and the like.

The mixture may be free from the plasticizer and the lubricant in some cases.

A dispersant solution may be used upon preparing the mixture according to the embodiment of the present invention. Examples of the dispersant solution include water, alcohols such as methanol, organic solvents such as benzene and toluene, and the like.

The mixture according to the embodiment of the present invention may contain a forming auxiliary.

The forming auxiliary is not particularly limited, and examples thereof include ethylene glycol, dextrin, fatty acids, fatty acid soaps, polyalcohols, and the like.

The temperature of the prepared mixture according to the embodiment of the present invention upon the molding step is desirably about 10° C. or less. The temperature of about 10° C. or less is less likely to cause gelation of the organic binder.

Examples of the pore-forming agent to be added to the mixture according to the embodiment of the present invention include spherical acrylic particles, graphite, and the like.

The mixture may be free from the pore-forming agent in some cases.

The plug material paste for sealing the cells is not particularly limited, and is desirably one which is to be formed into a plug having a porosity of from about 40% to about 50% through post processes. The paste may be the same material as the aforementioned mixture.

A catalyst may be supported on the honeycomb structure according to the embodiment of the present invention, if necessary. The catalyst to be supported on the honeycomb structure is not particularly limited, and examples thereof include noble metal elements, alkaline metal elements, alkaline earth metal elements, metal oxides, and the like. Each of these catalysts may be used alone, or two or more of these may be used in combination.

Examples of the noble metal element include platinum, palladium, rhodium, and the like. Examples of the alkaline metal element include potassium, sodium, and the like. Examples of the alkaline earth metal element include barium and the like. Examples of the metal oxide include $CeO_2$, $K_2O$, $ZrO_2$, $FeO_2$, $Fe_2O_3$, $CuO$, $CuO_2$, $Mn_2O_2$, $MnO$, a composite oxide represented by the formula of $A_nB_{1-n}CO_3$ (wherein $0 \leq n \leq 1$; A is La, Nd, Sm, Eu, Gd, or Y; B is an alkaline metal or an alkaline earth metal; and C is Mn, Co, Fe, or Ni), and the like.

The catalyst-supported honeycomb structure according to the embodiment of the present invention used as a honeycomb filter tends to lead to a low burning temperature of PM in the regenerating process.

The catalyst may be supported as follows: an alumina film having a high specific surface area is formed on the surface of the honeycomb structure; and the catalyst is applied to the surface of the alumina film.

The apparatus used upon forming a long body of the honeycomb molded body in the extrusion-molding step is not particularly limited. Examples thereof include a single-shaft screw-type extrusion molding apparatus, a multi-shaft screw-type extrusion molding apparatus, a plunger-type extrusion molding apparatus, and the like. In particular, the plunger-type extrusion molding apparatus is desirably used.

The drying apparatus used upon drying the honeycomb molded body after the cutting step or the honeycomb molded body after the sealing step is not particularly limited. Examples thereof include a micro-wave heating drying apparatus, a hot-air drying apparatus, an infra-red drying apparatus, and the like. Two or more of these may be used in combination.

What is claimed as new and is desired to be secured by Letters Patent of the United States is:

1. A honeycomb structure comprising:
   aluminum titanate;
   cell walls extending along a longitudinal direction of the honeycomb structure to define cells between the cell walls;
   pore portions having an average pore diameter of about 10 μm to about 20 μm; and
   a length of a longest pore portion among the pore portions in a binary image comprising substrate portions and the pore portions being about 8 times or less of the average pore diameter, wherein the binary image is converted from a microscopic image of a cross section of the cell walls in parallel with the longitudinal direction, and wherein the length is measured along a line drawn in a direction perpendicular to a thickness direction of the cell walls, and
   wherein the honeycomb structure is produced by using a mixture including a pore-forming agent having a particle-distribution index of 1.8-2.0, where the particle-distribution index is calculated as being equal to (D90-D10)/D50, where D90 is a 90% particle diameter, D50 is a 50% particle diameter, and D10 is a 10% particle diameter.

2. The honeycomb structure according to claim 1, wherein the length of the longest pore portion is about 7 times or less of the average pore diameter.

3. The honeycomb structure according to claim 1, wherein the length of the longest pore portion is about 5 times or less of the average pore diameter.

4. The honeycomb structure according to claim 1, wherein a total volume of pores having a pore diameter within a range from (the average pore diameter–about 2 μm) to (the average pore diameter+about 2 μm) in a pore diameter distribution is about 60% or more of a whole pore volume.

5. The honeycomb structure according to claim 1, wherein a total volume of pores having a pore diameter within a range from (the average pore diameter–about 2

μm) to (the average pore diameter+about 2 μm) in a pore diameter distribution is about 70% or more of a whole pore volume.

6. The honeycomb structure according to claim 1, wherein a porosity of the honeycomb structure is from about 40% to about 50%.

7. The honeycomb structure according to claim 1, wherein each of the cells is sealed at either one end.

8. The honeycomb structure according to claim 1, wherein an aperture ratio of the honeycomb structure is from about 50% to about 75%.

9. The honeycomb structure according to claim 1, wherein a thickness of the cell walls is from about 0.15 mm to about 0.4 mm.

10. The honeycomb structure according to claim 1, wherein a catalyst is supported on the honeycomb structure.

11. The honeycomb structure according to claim 10, wherein said catalyst comprises at least one of noble metal elements, alkaline metal elements, alkaline earth metal elements, and metal oxides.

12. The honeycomb structure according to claim 1, wherein
the honeycomb structure is prepared by
mixing an additive with powders of $Al_2O_3$ and $TiO_2$ to prepare a material powder,
sintering said material powder to manufacture a sintered body of aluminum titanate,
pulverizing and classifying said sintered body of aluminum titanate to prepare a coarse powder of aluminum titanate,
preparing another sintered body of aluminum titanate,
pulverizing and classifying said another sintered body of aluminum titanate at a different degree of pulverization and classification to prepare a fine powder of aluminum titanate,
preparing a mixture including said coarse powder of aluminum titanate and said fine powder of aluminum titanate,
extrusion-molding said mixture to manufacture a honeycomb molded body, and
firing said honeycomb molded body.

13. The honeycomb structure according to claim 12, wherein said additive comprises at least one of MgO and alkaline feldspar.

14. The honeycomb structure according to claim 12, wherein said mixture further comprises a pore-forming agent, an organic binder, a plasticizer, a lubricant, and water.

15. The honeycomb structure according to claim 12, wherein
said coarse powder of aluminum titanate has an average particle diameter of from about 5.0 μm to about 50.0 μm, and said fine powder of aluminum titanate has an average particle diameter of from about 0.1 μm to about 3.0 μm.

16. The honeycomb structure according to claim 12, wherein a mixing ratio of said coarse powder of aluminum titanate to said fine powder of aluminum titanate in said mixture is from about (9:1) to about (6:4).

17. A method for manufacturing a honeycomb structure, the method comprising:
molding a mixture to manufacture a honeycomb molded body having a plurality of cells longitudinally disposed substantially in parallel with one another; and
firing the honeycomb molded body to manufacture a honeycomb structure,
wherein the mixture comprises:
a pore-forming agent having a particle-distribution index of 1.8-2.0, where the particle-distribution index is calculated as being equal to (D90-D10)/D50, where D90 is a 90% particle diameter, D50 is a 50% particle diameter, and D10 is a 10% particle diameter, and
wherein the honeycomb structure has:
cell walls extending along a longitudinal direction of the honeycomb structure to define cells between the cell walls,
pore portions having an average pore diameter of about 10 μm to about 20 μm; and
a length of a longest pore portion among the pore portions in a binary image comprising substrate portions and the pore portions being about 8 times or less of the average pore diameter, wherein the binary image is converted from a microscopic image of a cross section of the cell walls in parallel with the longitudinal direction, and wherein the length is measured along a line drawn in a direction perpendicular to a thickness direction of the cell walls.

18. The method according to claim 17, wherein the length of the longest pore portion is about 7 times or less of the average pore diameter.

19. The method according to claim 17, wherein the length of the longest pore portion is about 5 times or less of the average pore diameter.

20. The method according to claim 17, wherein a total volume of pores having a pore diameter within a range from (the average pore diameter−about 2 μm) to (the average pore diameter+about 2 μm) in a pore diameter distribution is about 60% or more of a whole pore volume.

21. The method according to claim 17, wherein a total volume of pores having a pore diameter within a range from (the average pore diameter−about 2 μm) to (the average pore diameter+about 2 μm) in a pore diameter distribution is about 70% or more of a whole pore volume.

22. The method according to claim 17, wherein a porosity of the honeycomb structure is from about 40% to about 50%.

23. The method according to claim 17, wherein each of the cells is sealed at either one end.

24. The method according to claim 17, wherein an aperture ratio of the honeycomb structure is from about 50% to about 75%.

25. The method according to claim 17, wherein a thickness of the cell walls is from about 0.15 mm to about 0.4 mm.

26. The method according to claim 17, wherein a catalyst is supported on the honeycomb structure.

27. The method according to claim 26, wherein said catalyst comprises at least one of noble metal elements, alkaline metal elements, alkaline earth metal elements, and metal oxides.

28. The method according to claim 17, wherein
the honeycomb structure is prepared by
mixing an additive with powders of $Al_2O_3$ and $TiO_2$ to prepare a material powder,
sintering said material powder to manufacture a sintered body of aluminum titanate, pulverizing and classifying said sintered body of aluminum titanate to prepare a coarse powder of aluminum titanate,
preparing another sintered body of aluminum titanate, pulverizing and classifying said another sintered body of aluminum titanate at a different degree of pulverization and classification to prepare a fine powder of aluminum titanate, preparing a mixture including said coarse powder of aluminum titanate and said fine powder of aluminum titanate, extrusion-molding said mixture to manufacture a honeycomb molded body, and firing said honeycomb molded body.

29. The method according to claim 28,
wherein said additive comprises at least one of MgO and alkaline feldspar.

30. The method according to claim 28,
wherein said mixture further comprises a pore-forming agent, an organic binder, a plasticizer, a lubricant, and water.

31. The method according to claim 28, wherein
said coarse powder of aluminum titanate has an average particle diameter of from about 5.0 μm to about 50.0 μm, and
said fine powder of aluminum titanate has an average particle diameter of from about 0.1 μm to about 3.0 μm.

32. The method according to claim 28,
wherein a mixing ratio of said coarse powder of aluminum titanate to said fine powder of aluminum titanate in said mixture is from about (9:1) to about (6:4).

* * * * *